(12) United States Patent
Premnath et al.

(10) Patent No.: US 8,631,491 B2
(45) Date of Patent: Jan. 14, 2014

(54) REPLAY ATTACK PROTECTION WITH SMALL STATE FOR USE IN SECURE GROUP COMMUNICATION

(75) Inventors: Sriram Nandha Premnath, Salt Lake City, UT (US); Vladimir Kolesnikov, Jersey City, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/429,021

(22) Filed: Mar. 23, 2012

(65) Prior Publication Data

US 2013/0152195 A1  Jun. 13, 2013

Related U.S. Application Data

(60) Provisional application No. 61/569,393, filed on Dec. 12, 2011.

(51) Int. Cl.
*G06F 21/00* (2013.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | |
|---|---|---|---|
| 6,978,384 B1* | 12/2005 | Milliken ......................... | 726/26 |
| 2005/0149734 A1* | 7/2005 | Eronen et al. ................. | 713/176 |
| 2006/0137009 A1* | 6/2006 | Chesla ............................ | 726/22 |
| 2009/0019537 A1* | 1/2009 | Stavrou et al. ................. | 726/13 |
| 2009/0300354 A1* | 12/2009 | Shon et al. .................... | 713/168 |
| 2011/0158410 A1 | 6/2011 | Falk et al. | |
| 2012/0066764 A1* | 3/2012 | Kim ................................ | 726/22 |

OTHER PUBLICATIONS

Fan et al., "A Steiner-Based Secure Multicast Routing Protocol for Wireless Sensor Network", 2010, IEEE Computer Society, pp. 159-163.*
PCT/US2012/067833 Notification of Transmittal of the International Search Report and the Written Opinion of the International Searching Authority, or the Declaration dated Mar. 21, 2013.
Young-Jin Kim et al: "SSTP: A Scalable and Secure Transport Protocol for Smart Grid Data Collection", Smart Grid Communications, 2011 IEEE International Conference on, IEEE, Oct. 17, 2011, pp. 161-166.

* cited by examiner

*Primary Examiner* — Matthew Smithers
(74) *Attorney, Agent, or Firm* — S. R. Santema

(57) ABSTRACT

A replay detection technique with "small state" (e.g., with relatively few bits of state information). A sending node generates a random number $r_i$, retrieves a code sequence ($h^*_{i-1}$), in one example, comprising the last 5 bits of a hash value ($h_{i-1}$) of a previous packet i−1, generates a hash value $h_i$ based on the random number $r_i$ and the code sequence ($h^*_{i-1}$), and formulates a packet with index i including $h_i$, $r_i$ and $data_i$ for delivery to a receiving node. The receiving node retrieves $r_i$ and $h_i$ from packet i; retrieves a code sequence ($h^*_j$) associated with a previous packet j, in one embodiment, comprising the last 5 bits of a hash value ($h_j$) of a previous packet j, generates a hash value ($h_{j+1}$) based on the random number $r_i$ and the code sequence ($h^*_j$); and declares a replay attack if $h_i$ does not equal $h_{j+1}$.

20 Claims, 3 Drawing Sheets

REPLAY ATTACK PROTECTION WITH SMALL STATE FOR USE IN SECURE GROUP COMMUNICATION

FIELD OF THE INVENTION

This invention relates generally to network security and, more particularly, to techniques for addressing the threat of replay attacks in secure group communication networks.

BACKGROUND OF THE INVENTION

Many networks support secure group communication, wherein a group with multiple senders may transmit packets to a single receiver using a secure channel. Here, the transmitted packets are encrypted using a secret key shared between all the group members. As one example, distributed sensor networks (such as "Smart Grid" energy metering networks) rely on a multitude of sensors to report measurements, such as temperature, electricity consumption, etc., and this information may be communicated to a central node using a secure channel. One of the easiest types of attacks that an external adversary can launch, without any knowledge of the secret key, is a replay attack. A replay attack is a form of network attack in which an adversary captures packets from the network and then maliciously injects those packets into the network later so as to masquerade as a legitimate sender and attempt to have the receiver accept the replayed packets as fresh legitimate packets.

A standard solution to detect replay attacks is to use counters. These counters are internally stored at both the sender and the receiver, and incremented once per packet. The sender includes the counter in each packet and encrypts it along with the packet data. The receiver accepts a packet only if the counter on the decrypted packet is greater than the counter it has stored internally. However, notice that while a single secret key shared between all group members will suffice for encrypting the packets (or alternatively, the group members' key can be derived from the receiver's master secret), the receiver needs to maintain a separate counter for each sender. Further, notice that counters will only work if they are long enough (e.g., with 32 bits) so that they do not overflow and wrap-around after reaching a maximum value (e.g., $2^{32}-1$ for a 32-bit counter) in a reasonably short duration. Thus, the use of counters does not scale well in a system with a large number of senders. As an example, if there are a million senders, maintaining a 32-bit counter per sender requires the receiver to store 32 million bits of state information. This can be a challenge for small devices.

More recent solutions use a combination of counters (at the sender) and a bloom filter (at the receiver). However, a bloom filter does not scale well when there are a large number of senders that transmit a large numbers of packets because the required state space depends on both the number of senders and the number of packets that are transmitted by each sender. As an example, if there are a million senders that transmit 1000 packets each, a bloom filter needs approximately 30 billion bits $[(10^{\wedge}6) \times (10^{\wedge}3) \times \log\_2((10^{\wedge}6) \times (10^{\wedge}3))]$ of state information.

Accordingly, there is a need for an improved replay attack detection solution that can be accomplished with substantially reduced state information relative to the prior art. Advantageously, the improved replay attack detection solution can be implemented in secure group communication networks with a large number of senders, with a state information storage overhead that is much less than the counter size per sender multiplied by the number of senders (e.g., 32 bits per sender×n senders) and that is independent of the number of packets transmitted by each sender. Embodiments of the present invention are directed to addressing this need.

SUMMARY OF THE INVENTION

Generally, embodiments of the present invention describe a replay detection technique with "small state" (i.e., with a small amount of state information storage overhead) that can be implemented in secure group communication networks with a large number of senders.

In one embodiment, there is provided a method carried out by a sending node, in association with sending a packet with index i to a receiving node. The sending node generates a random number r retrieves a stored state value ($h^*_{i-1}$) [a code sequence comprising the last s bits (e.g., 5 bits) of a hash value ($h_{i-1}$) of a previous packet with index i−1], generates a hash value $h_i$ based on the random number $r_i$ and the code sequence ($h^*_{i-1}$), formulates a packet with index i including $h_i$, $r_i$ and $data_i$; and sends the packet i to the receiving node. As part of the sent packet, $h_i$ and $r_i$ are retrievable by the receiving node for use in detecting replay attacks, the receiving node maintaining a code sequence ($h^*_j$), generating a hash value ($h_{j+1}$) based on the random number $r_i$ and the code sequence ($h^*_j$), and declaring a replay attack if $h_i$ does not equal $h_{j+1}$.

In another embodiment, there is provided an apparatus for facilitating the detection of replay attacks, in accordance with a communication network including a sending node operably linked to a receiving node, the apparatus at the sending node comprising an input interface, an output interface, a memory and at least one processor operably coupled to the input interface, output interface and memory. The processor is configured, in association with a packet index i, to (a) generate a random number $r_i$; (b) retrieve a code sequence ($h^*_{i-1}$), in one embodiment, comprising the last s bits (e.g., 5 bits) of a hash value ($h_{i-1}$) of a previous packet index i−1; (c) generate a hash value $h_i$ based on the random number $r_i$ and the code sequence ($h^*_{i-1}$); (d) formulate a packet with index i including $h_i$, $r_i$ and data; (e) encrypt the packet i, yielding an encrypted packet i, and (f) send the encrypted packet i to the receiving node; wherein the receiving node decrypts the encrypted packet i to retrieve $h_i$ and $r_i$, the receiving node maintaining a code sequence ($h^*_j$), generating a hash value ($h_{j+1}$) based on the random number $r_i$ and the code sequence ($h^*_j$), and declaring a replay attack if $h_i$ does not equal $h_{j+1}$.

In yet another embodiment, there is provided a method carried out by a receiving node, in accordance with a communication network including a plurality of sending nodes operably linked to a receiving node. The method comprises the receiving node receiving a packet index i from a sending node, the packet i including a random number $r_i$ a hash value $h_i$ and a data string ($data_i$), wherein the hash value $h_i$ is nominally based on a code sequence ($h^*_{i-1}$) associated with a previous packet index i−1; retrieving the random number $r_i$ and hash value $h_i$ from packet i; retrieving a code sequence ($h^*_j$) associated with a previous packet index j, in one embodiment, comprising the last s bits (e.g., 5 bits) of a hash value ($h_j$) of a previous packet index j, generating a hash value ($h_{j+1}$) based on the random number $r_i$ and the code sequence ($h^*_j$); and declaring a replay attack if $h_i$ does not equal $h_{j+1}$; otherwise accepting packet i if h, equals $h_{j+1}$.

In still another embodiment, there is provided an apparatus for detecting replay attacks, in accordance with a communication network including a sending node operably linked to a receiving node, the apparatus at the receiving node comprising an input/output interface; a memory; and at least one processor operably coupled to the input/output interface and memory. The processor is configured to: (a) receive a packet index i from a sending node, the packet i including a random number $r_i$, a hash value $h_i$ and a data sequence (data$_i$), wherein the hash value $h_i$ is nominally based on a code sequence ($h^*_{i-1}$) associated with a previous packet index i−1; (b) retrieve the random number $r_i$ and hash value $h_i$ from packet i; (c) retrieve a code sequence ($h^*_j$) associated with a previous packet index j, in one embodiment, comprising the last s bits (e.g., 5 bits) of a hash value ($h_j$) of a previous packet index j, (d) generate a hash value ($h_{j+1}$) based on the random number $r_i$ and the code sequence ($h^*_j$); and (e1) declare a replay attack if $h_i$ does not equal $h_{j+1}$; otherwise (e2) accept packet i if $h_i$ equals $h_{j+1}$.

BRIEF DESCRIPTION OF THE DRAWINGS

The foregoing and other advantages of the invention will become apparent upon reading the following detailed description and upon reference to the drawings in which.

DESCRIPTION OF THE PREFERRED
EMBODIMENT(S)

Figure 1:
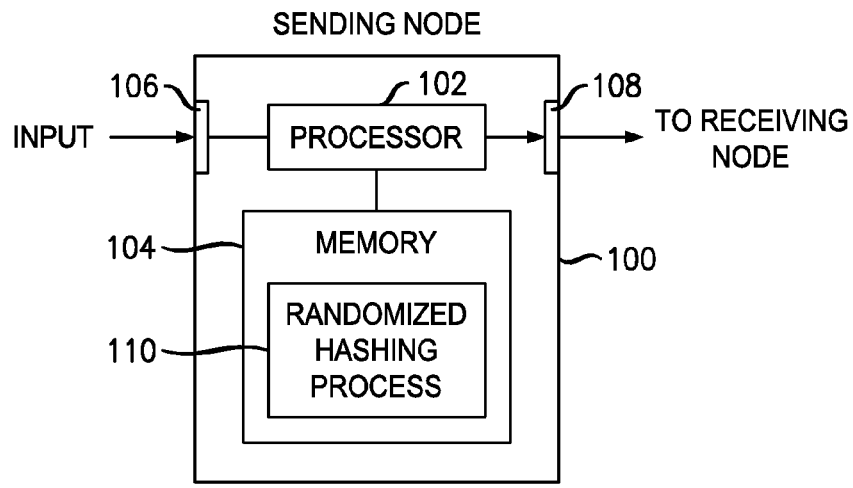
FIG. 1 is a block diagram illustrating a logical hardware configuration of a sending node in a secure group communication network.

FIG. 1 illustrates a logical hardware configuration of a sending node 100 in a secure group communication network according to embodiments of the present invention.

The sending node 100 comprises any system, server, application or function adapted to communicate data with other node(s) of a secure group communication network. For example and without limitation, sending nodes may comprise or be associated with multiple sensors deployed throughout a sensor network (such as a "Smart Grid" energy metering network), the multiple sensors comprising a group, wherein each of the sending nodes of the group nominally communicate payload data (e.g., sensor data or the like) to a designated receiving node (e.g., central node or the like) via a secure channel.

As will be appreciated, the sending node 100 is a logical hardware component that may embody firmware, microchips (e.g., ASICs), software executable on a hardware device, hardware, specialized hardware, and/or the like, may be implemented in one or more physical devices and may implement one or more communication technologies including wired, wireless or packet-based links. The sending node 100 may be arranged in virtually any type of network configuration, including linear, tree or star-based architectures or combinations thereof.

The sending nodes 100 include a processor 102 and memory 104 for effecting secure communication transactions with the receiving node, comprising, generally, formation of data packets including respective header and payload information, encryption of the packets and transmission of the packets to the receiving node. The processor and memory are logically connected to an input interface 106 that receives inputs (e.g., payload data) from sensors associated with the sending node or from other nodes; and an output interface 108 that sends output (e.g., data packets) to a designated receiving node or to other nodes.

The logical hardware configuration further includes a randomized hashing process module 110 for generating a random number ($r_i$) for each respective packet (let i, where i>0, denote the index of each respective packet) and a randomized authentication tag ($h_i$). The module 110 inserts these values in the packet header for use by the receiver to detect replay attacks. The operation of the randomized hashing process module and computation of the values $h_i$ and $r_i$ will be described in greater detail in relation to FIG. 4. The randomized hashing process module 110 may be implemented, for example and without limitation, by the processor 102 executing program code (e.g., including but not limited to operating system firmware/software and application software) stored in the memory 104 to generate the values $h_i$ and $r_i$ for each packet index, and for storing past values, intermediate calculations, or the like, where appropriate.

Figure 2:
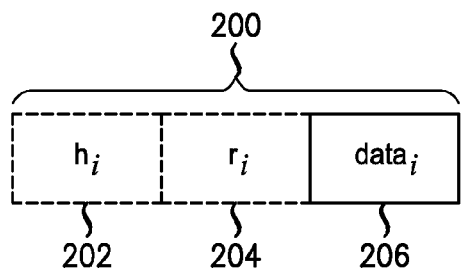
FIG. 2 illustrates an exemplary data packet formed by the sending node according to embodiments of the present invention.

FIG. 2 shows an exemplary data packet 200 produced by the sending node 100. The packet 200 represents a plaintext (i.e., unencrypted) packet with index i. The processor inserts the authentication tag $h_i$ and the random number $r_i$ in respective fields 202, 204, forming a packet header, and inserts payload data (data$_i$) in field 206. As will be appreciated, the length of fields 202 (authentication tag $h_i$), 204 (random number $r_i$) and 206 (data$_i$) are generally a matter of design choice, the type of hashing algorithm or the like. In one example, the field 202 (authentication tag $h_i$) comprises 160 bits (e.g., the output of the SHA-1 or SHA-2 secure hashing algorithm), the field 204 (random number $r_i$) comprises 60 bits and the field 206 (data$_i$) comprises 256 bits. The packet 200 is represented by the expression ($h_i$||$r_i$||data$_i$), where || denotes concatenation. The packet 200 is encrypted before transmission to the receiving node.

Figure 3:
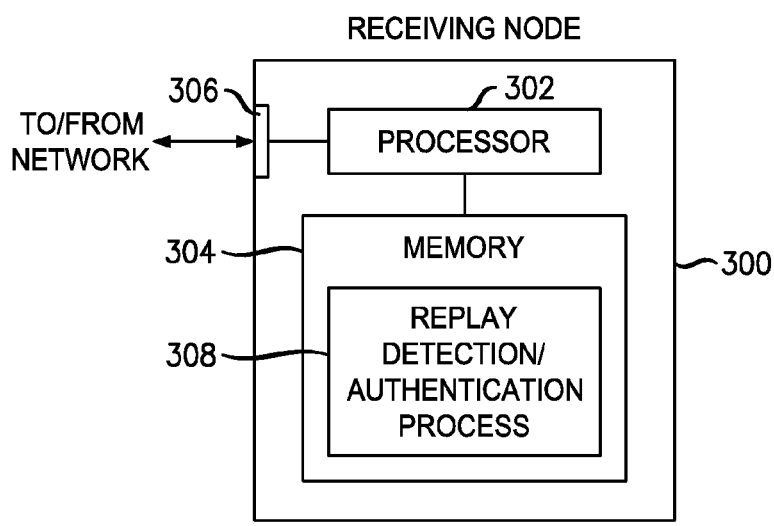
FIG. 3 is a block diagram illustrating a logical hardware configuration of the receiving node in a secure group communication network.

FIG. 3 illustrates the logical hardware configuration of a receiving node 300 in a secure group communication network according to embodiments of the present invention.

The receiving node 300 comprises any system, server, application or function adapted to receive data within a secure group communication network. For example and without limitation, the receiving node 300 may receive payload data (e.g., sensor data or the like) from multiple sensors deployed throughout a sensor network (such as a "Smart Grid" energy metering network), the multiple sensors comprising or being associated with sending nodes such as described in relation to FIG. 1.

As will be appreciated, the receiving node 300 is a logical hardware component that may embody firmware, microchips (e.g., ASICs), software executable on a hardware device, hardware, specialized hardware, and/or the like, may be implemented in one or more physical devices and may implement one or more communication technologies including wired, wireless or packet-based links. The receiving node 300 may be arranged in virtually any type of network configuration, including linear, tree or star-based architectures or combinations thereof.

The receiving node 300 includes a processor 302 and memory 304 for effecting secure communication transactions with one or more sending nodes, comprising, generally, receiving and decrypting packets 200 transmitted from the sending nodes, yielding decrypted packets, and retrieving header and payload information $h_i$, $r_i$, data$_i$ from the decrypted packets. The processor and memory are logically connected to an input/output interface 306 that receives incoming packets from the sending nodes and, where applicable, communicates payload or control information to the sending nodes or other network nodes.

The logical hardware configuration further includes a replay detection/authentication process module 308 (hereinafter "replay detection module") for detecting replay attacks, based on the header information $h_i$, $r_i$ obtained from received packets, computation of a second authentication tag $h_{j+1}$ and comparison of the respective tags $h_i$ and $h_{j+1}$. The computed tag $h_{j+1}$ will nominally match the retrieved tag $h_i$ if the received packet is from an authorized sender. But if $h_i \neq h_{j+1}$, the receiving node declares a replay attack because the received packet may have been obtained from an unauthorized sender.

Figure 5:
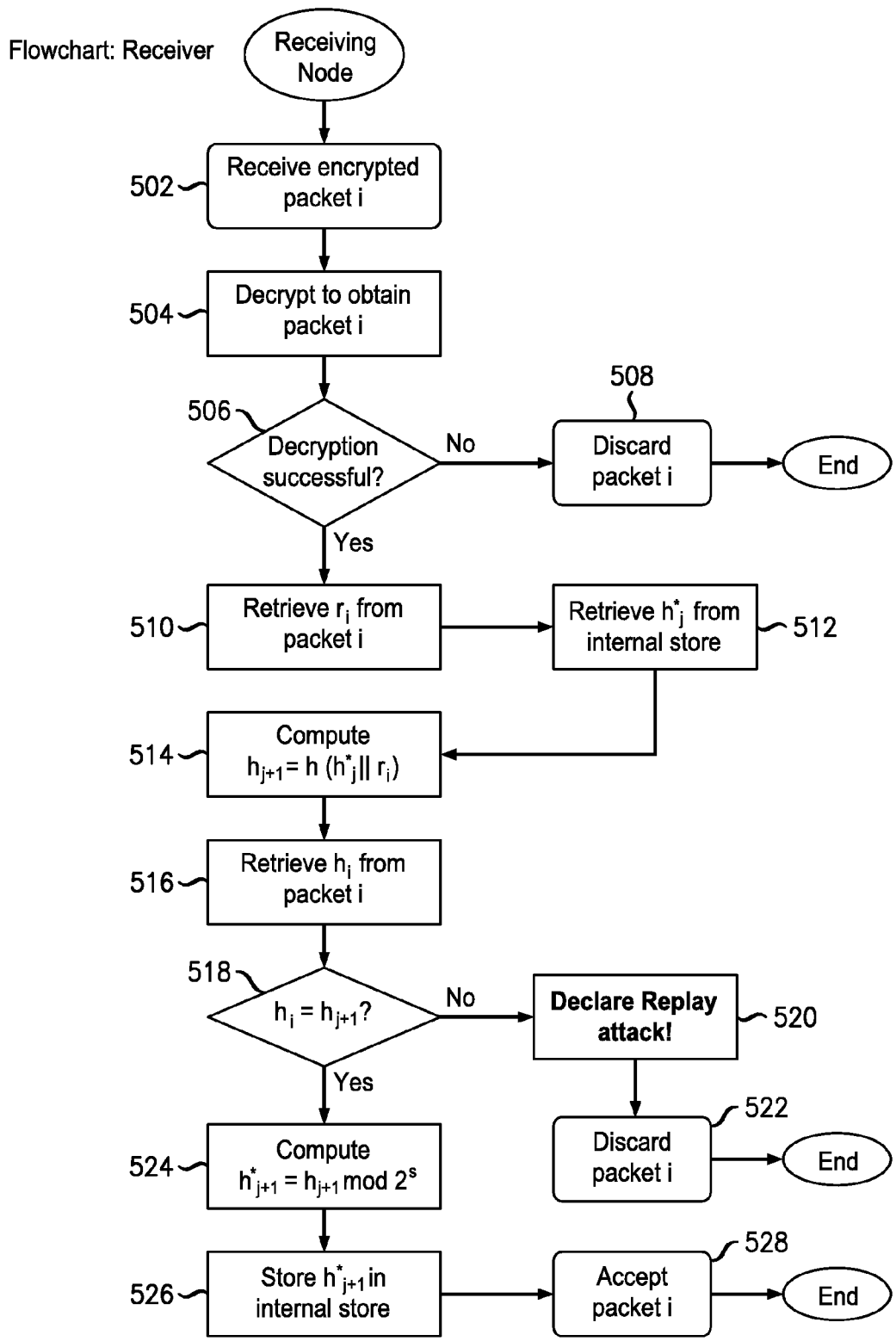
FIG. 5 is a flowchart showing steps performed by the receiving node according to embodiments of the present invention.

The operation of the replay detection module 308 will be described in greater detail in relation to FIG. 5. The replay detection module 308 may be implemented, for example and without limitation, by the processor 302 executing program code (e.g., including but not limited to operating system firmware/software and application software) stored in the memory 304 to compute the values $h_{j+1}$ for each packet index, and for storing past values, intermediate calculations, or the like, where appropriate.

Figure 4:
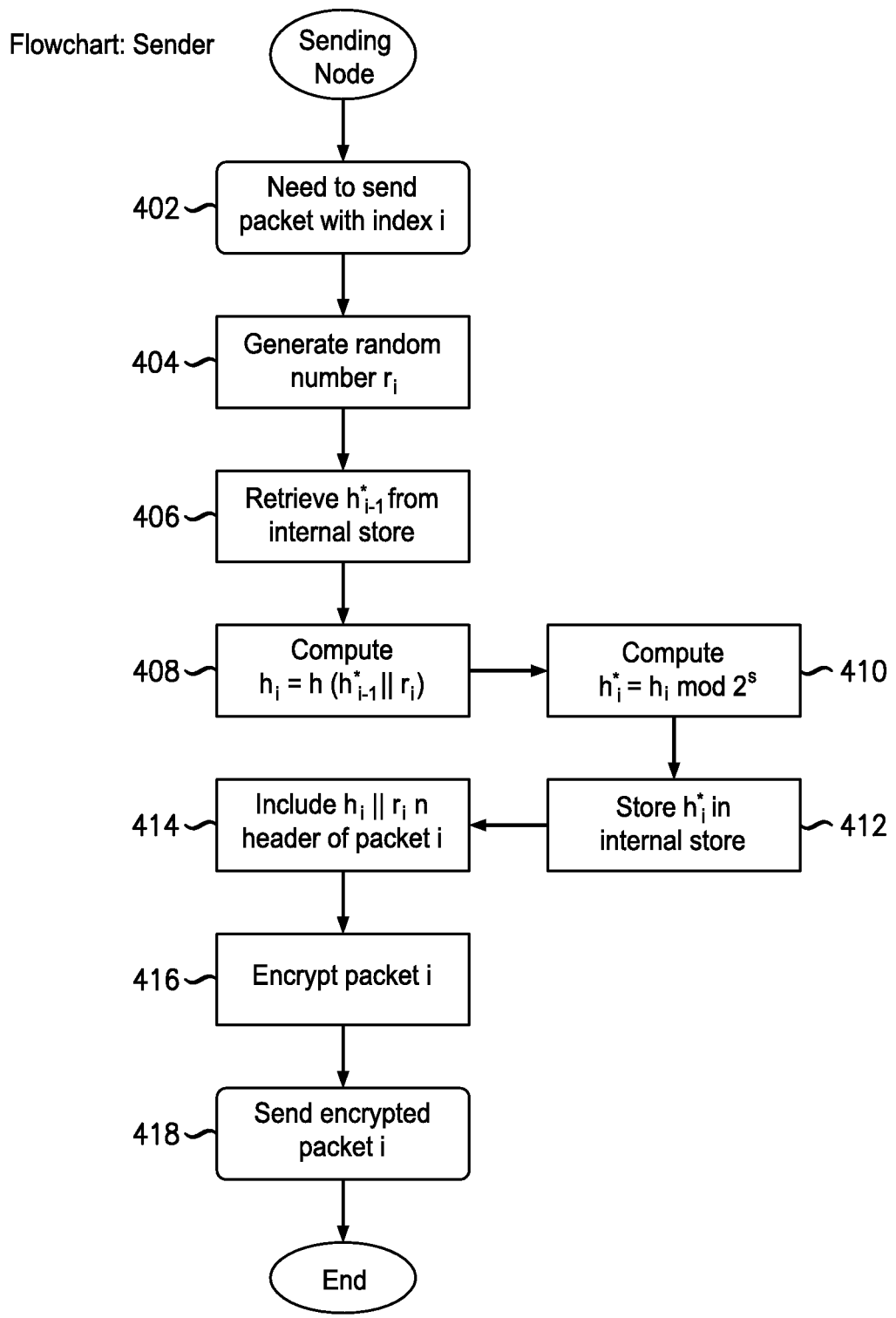
FIG. 4 is a flowchart showing steps performed by the sending node according to embodiments of the present invention.

Now turning to FIG. 4, the operation of the sending node 100 (FIG. 1) will be described in greater detail. The steps of FIG. 4 are performed, where applicable, by the randomized hashing process module 110 in cooperation with the processor 102 and memory 104 of the sending node 100.

The process begins at step 402 in the instance that the sending node 100 needs to send a packet with index i to the receiving node 300 (FIG. 3). At step 404, the randomized hashing process module 110 generates a random number $r_i$ corresponding to packet index i. At step 406, the randomized hashing process module 110 retrieves from memory a value $h^*_{i-1}$ which is based on a hash value ($h_{i-1}$) of the previous packet (i.e., the last s bits of state of the previous hash value $h_{i-1}$). Then, at step 408, the randomized hashing process module 110 computes a hash value $h_i$ that is a function of the previous s-bit value $h^*_{i-1}$ concatenated with the random number $r_i$, as follows:

$$h_i = h(h^*_{i-1} \| r_i),$$

where $h_i^* = h_i \bmod 2^s$, for $1 \leq s \leq \log_2 m$, and $h_0 = 0$.

At step 410, the randomized hashing process module 110 computes the s-bit value $h_i^* = h_i \bmod 2^s$ associated with the present hash value $h_i$, comprising the last s bits of state of the value $h_i$; and at step 412, stores $h_i^*$ in memory 104.

At step 414, the randomized hashing process module 110 forms a packet of index i ($h_i \| r_i \| data_i$), where $h_i$ and $r_i$ are included in the packet header such as depicted in FIG. 2. At step 416, the randomized hashing process module 110 encrypts the packet i; and at step 418, sends the encrypted packet i to the receiving node.

Now turning to FIG. 5, the operation of the receiving node 300 (FIG. 3) will be described in greater detail. The steps of FIG. 5 are performed, where applicable, by the replay detection module 308 in cooperation with the processor 302 and memory 304 of the receiving node 300.

The process begins at step 502 in the instance that the receiving node 300 receives an encrypted packet with index i from a sending node 100. At step 504, the replay detection module 308 attempts to decrypt the packet to obtain the corresponding plaintext packet with index i. At step 506, a determination is made as to whether the decryption was successful. If not, the replay detection module 308 discards the packet i at step 508. If the decryption was successful, the replay detection module 308 retrieves the random number $r_i$ from the decrypted packet header at step 510.

Note that in the absence of a replay attack, the replay detection module would nominally expect the present received packet index i to be the next consecutive packet (i.e., incremented by one) relative to its last received packet. But in the case of a replay attack, the present received packet index i may correspond to an earlier received packet. Or, stated generally, the presently received packet index may differ from the expected packet index. Hereinafter, let i,j denote packet indices such that i≤j. Assume that packet index j was the receiver's last received packet, thus the receiver expects to receive packet index j+1 as its next received packet. However, the present received packet index i may or may not correspond to packet index j+1, and it follows that the receiver's last received packet index j may not correspond to packet index i−1.

At step 512, the replay detection module 308 retrieves from memory a value $h^*_j$ which is based on a hash value ($h_j$) of its last received packet (i.e., the last s bits of state of the previous hash value $h_j$). Then, at step 514, the replay detection module 308 computes a hash value $h_{j+1}$ that is a function of the previous s-bit value $h^*j$ concatenated with the random number $r_i$, as follows:

$$h_{j+1} = h(h^*_j \cdot \| r_i),$$

where $h_j^* = h_j \bmod 2^s$, for $1 \leq s \leq \log_2 m$, and $h_0 = 0$.

At step 516, the replay detection module 308 retrieves the hash value $h_i$ from the packet header of the present received packet index i. At step 518, the replay detection module compares $h_i$ and $h_{j+1}$ and considers the received packet index i to be legitimate only if the retrieved hash value $h_i$ equals the computed hash value $h_{j+1}$ associated with the expected packet index j+1. If $h_i \neq h_{j+1}$, the replay detection module 308 declares a replay attack at step 520 and discards the packet i at step 522. If $h_i = h_{j+1}$, the replay detection module considers the received packet index i to be legitimate, computes at step 524 the s-bit value $h_{j+1}^* = h_{j+1} \bmod 2^s$ associated with the present hash value $h_{j+1}$, comprising the last s bits of state of the value $h_{j+1}$; stores $h_{j+1}^*$ in memory at step 526; and accepts the packet at step 528.

Therefore, the received packet index i is properly accepted as legitimate in the instance that i=j+1. There are also limited instances where the received packet index i comprises a replay packet but the receiver fails to detect the replay attack (i.e., the receiver considers the packet index i to be legitimate). This occurs under the following cases:

Case 1 (replay packet): i≤j and $h_j^* = h^*_{i-1}$. Since the values maintained in memory are s bits in length, the probability of this event is given by probability $[h_j^* = h^*_{i-1}] = (2^s)^{-1}$.

Case 2 (replay packet): i≤j and $h_j^* \neq h^*_{i-1}$ and there is a hash collision. The probability of this event is given by probability $[h_j^* \neq h^*_{i-1}] \times p_{collision} \leq (1 - (2^s)^{-1}) \times m^{-1}$.

Note that cases 1 and 2 represent mutually exclusive events. Therefore, the sum of their probabilities corresponds to the probability that the receiver fails to detect the replay attack ($p_f$), which is shown below:

$$p_f \leq (2^s)^{-1} + (1 - (2^s)^{-1}) \times m^{-1}$$

In other words, the receiver detects a replay attack successfully with probability $p_d$, which is shown below:

$$p_d = 1 - p_f \geq (1 - (2^s)^{-1}) \times (1 - m^{-1})$$

We effectively force an adversary to guess the s-bit state in order to succeed, with any incorrect guess being detected as a replay attack. We find that even if the receiver maintains a very small number of bits per sender in its memory, it is sufficient enough to detect replay attacks with a probability almost equal to one. For example, with m=64 and s=5, $p_d$>95%; i.e., just 5 bits of state provides a detection probability greater than 95%. When there are a million senders, such as might occur in a distributed sensor network, the receiver according to principles of the present invention need only store on the order of 5 million bits of state, which is substantially less than solutions using counters and/or bloom filters according to the prior art.

As will be appreciated, implementations may be realized with s<5, if $p_d$ less than 95% is acceptable; or s>5, to acheive $p_d$ greater than 95%. Suffice it to say that any implementation with s≤10-15 bits represents a substantial reduction of state information storage relative to the prior art.

FIGS. 1-5 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

What is claimed is:

1. In a communication network including a sending node operably linked to a receiving node, the sending node operable to send data packets to the receiving node, a method comprising the sending node, in association with a packet index i:
   generating a random number $r_i$;
   retrieving a code sequence ($h^*_{i-1}$);
   generating a hash value $h_i$ based on the random number $r_i$ and the code sequence ($h^*_{i-1}$);
   formulating a packet with index i including $h_i$, $r_i$ and $data_i$; and
   sending the packet i to the receiving node; wherein $h_i$ and $r_i$ are retrievable by the receiving node for use in detecting replay attacks, the receiving node maintaining a code sequence ($h^*_j$), generating a hash value ($h_{j+1}$) based on the random number $r_i$ and the code sequence ($h^*_j$), and declaring a replay attack if $h_i$ does not equal $h_{j+1}$.

2. The method of claim 1, wherein the step of formulating a packet with index i comprises including $h_i$ and $r_i$ in a packet header of the packet i.

3. The method of claim 2, further comprising the sending node encrypting the packet i, yielding an encrypted packet i, wherein the receiving node decrypts the encrypted packet i to retrieve $h_i$ and $r_i$.

4. The method of claim 1, wherein the code sequence ($h^*_{i-1}$) comprises the last s bits of a hash value ($h_{i-1}$) of a previous packet index i-1.

5. The method of claim 4, wherein s≤10.

6. The method of claim 4, wherein s=5.

7. Apparatus for facilitating the detection of replay attacks, in accordance with a communication network including a sending node operably linked to a receiving node, the sending node operable to send data packets to the receiving node, the apparatus at the sending node comprising:
   an input interface;
   an output interface;
   a memory; and
   at least one processor operably coupled to the input interface, output interface and memory and configured, in association with a packet index i, to:
   (a) generate a random number $r_i$;
   (b) retrieve a code sequence ($h^*_{i-1}$);
   (c) generate a hash value $h_i$ based on the random number $r_i$ and the code sequence ($h^*_{i-1}$);
   (d) formulate a packet with index i including $h_i$, $r_i$ and $data_i$;
   (e) encrypt the packet i, yielding an encrypted packet i, and
   (f) send the encrypted packet i to the receiving node; wherein the receiving node decrypts the encrypted packet i to retrieve $h_i$ and $r_i$ the receiving node maintaining a code sequence ($h^*_j$), generating a hash value ($h_{j+1}$) based on the random number $r_i$ and the code sequence ($h^*_j$), and declaring a replay attack if $h_i$ does not equal $h_{j+1}$.

8. The apparatus of claim 7, wherein step (d) comprises including $h_i$ and $r_i$ in a packet header of the packet i.

9. The apparatus of claim 8, wherein the code sequence ($h^*_{i-1}$) comprises the last s bits of a hash value ($h_{i-1}$) of a previous packet index i-1.

10. The apparatus of claim 9, wherein s≤10.

11. The apparatus of claim 9, wherein s=5.

12. In a communication network including a plurality of sending nodes operably linked to a receiving node, a method comprising the receiving node:
   receiving a packet index i from a sending node, the packet i including a random number $r_i$, a hash value $h_i$ and a data string ($data_i$), wherein the hash value $h_i$ is nominally based on a code sequence ($h^*_{i-1}$) associated with a previous packet index i-1;
   retrieving the random number $r_i$ and hash value $h_i$ from packet i;
   retrieving a code sequence ($h^*_j$) associated with a previous packet index j;
   generating a hash value ($h_{j+1}$) based on the random number $r_i$ and the code sequence ($h^*_j$); and
   declaring a replay attack if $h_i$ does not equal $h_{j+1}$; otherwise accepting packet i if $h_i$ equals $h_{j+1}$.

13. The method of claim 12, wherein the step of receiving a packet comprises receiving an encrypted packet i from the sending node, the receiving node decrypting the encrypted packet to retrieve $h_i$ and $r_i$.

14. The method of claim 12, wherein the code sequence ($h^*_j$) comprises the last s bits of a hash value ($h_j$) of a previous packet index j.

15. The method of claim 14, wherein s≤10.

16. The method of claim 14, wherein s=5.

17. Apparatus for detecting replay attacks, in accordance with a communication network including a sending node operably linked to a receiving node, the apparatus at the receiving node comprising:
   an input/output interface;
   a memory; and
   at least one processor operably coupled to the input/output interface and memory and configured to:
   (a) receive a packet index i from a sending node, the packet i including a random number $r_i$, a hash value $h_i$ and a data string ($data_i$), wherein the hash value $h_i$ is nominally based on a code sequence ($h^*_{i-1}$) associated with a previous packet index i-1;
   (b) retrieve the random number $r_i$ and hash value $h_i$ from packet i;
   (c) retrieve a code sequence ($h^*_j$) associated with a previous packet index j;
   (d) generate a hash value ($h_{j+1}$) based on the random number $r_i$ and the code sequence ($h^*_j$); and
   (e1) declare a replay attack if $h_i$ does not equal $h_{j+1}$; otherwise
   (e2) accept packet i if $h_i$ equals $h_{j+1}$.

18. The apparatus of claim 17, wherein the code sequence ($h^*_j$) comprises the last s bits of a hash value ($h_j$) of a previous packet index j.

19. The apparatus of claim 18, wherein $s \leq 10$.

20. The apparatus of claim 18, wherein $s=5$.

* * * * *